(12) United States Patent
Kim

(10) Patent No.: US 7,405,534 B2
(45) Date of Patent: Jul. 29, 2008

(54) APPARATUS AND METHOD FOR CONTROLLING VELOCITY OF MOTOR

(75) Inventor: Hyun-bae Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 11/262,846

(22) Filed: Nov. 1, 2005

(65) Prior Publication Data

US 2006/0119309 A1 Jun. 8, 2006

(30) Foreign Application Priority Data

Dec. 8, 2004 (KR) .................. 10-2004-0103251

(51) Int. Cl.
*H02P 27/04* (2006.01)
(52) U.S. Cl. .................. 318/800; 318/807; 318/801; 318/808
(58) Field of Classification Search .............. 318/807, 318/800, 801
See application file for complete search history.

(56) References Cited

U.S. PATENT DOCUMENTS

| | | | | |
|---|---|---|---|---|
| 5,585,709 | A | * | 12/1996 | Jansen et al. ............... 318/807 |
| 5,854,547 | A | * | 12/1998 | Nakazawa ................... 318/716 |
| 6,081,093 | A | * | 6/2000 | Oguro et al. ................ 318/807 |
| 6,137,258 | A | * | 10/2000 | Jansen ......................... 318/802 |
| 6,552,509 | B2 | * | 4/2003 | Veltman ...................... 318/807 |
| 6,598,008 | B2 | * | 7/2003 | Lee .............................. 702/147 |
| 6,735,284 | B2 | * | 5/2004 | Cheong et al. .............. 318/801 |
| 6,788,024 | B2 | * | 9/2004 | Kaneko et al. .............. 318/807 |
| 7,045,988 | B2 | * | 5/2006 | Ha et al. ...................... 318/807 |
| 2004/0100220 | A1 | | 5/2004 | Fu |

FOREIGN PATENT DOCUMENTS

| | | |
|---|---|---|
| EP | 0831-580 A2 | 9/1997 |
| JP | 9-172793 A | 6/1997 |
| JP | 11-89274 A | 3/1999 |
| JP | 2001-204190 A | 7/2001 |
| KR | 10-0408061 B1 | 11/2003 |
| KR | 10-0431287 B1 | 4/2004 |
| KR | 2004-0041222 A | 5/2004 |

* cited by examiner

*Primary Examiner*—Lincoln Donovan
*Assistant Examiner*—Antony M Paul
(74) *Attorney, Agent, or Firm*—Sughrue Mion, PLLC

(57) ABSTRACT

An apparatus controlling a velocity of a motor having a rotor, includes a sensing velocity calculator sensing a rotation velocity of the motor, and calculating a sensing velocity on the basis of the sensed rotation velocity of the motor; a velocity estimator estimating an estimation velocity of the motor based on an information about a position error of the rotor; and a reference velocity calculator dividing an overall velocity period of the motor into a plurality of unit velocity periods based on a command velocity for controlling the rotation velocity of the motor, calculating a sum of the sensing velocity, the estimation velocity, and the command velocity after multiplying at least one of the sensing velocity, the estimation velocity, and the command velocity by a predetermined weight, and outputting the sum as a reference estimation velocity of the motor.

20 Claims, 5 Drawing Sheets

APPARATUS AND METHOD FOR CONTROLLING VELOCITY OF MOTOR

CROSS-REFERENCE TO RELATED APPLICATIONS

This application claims priority from Korean Patent Application No. 10-2004-0103251, filed on Dec. 8, 2004, in the Korean Intellectual Property Office, the disclosure of which is incorporated herein by reference.

BACKGROUND OF THE INVENTION

1. Field of the Invention

Apparatuses and methods consistent with the present invention relate to controlling a velocity of a motor, and more particularly, to controlling a velocity of a motor by calculating an accurate reference estimation velocity of the motor in an overall velocity period of the motor.

2. Description of the Related Art

Generally, a vector control method for calculating an accurate rotation velocity of a motor is broadly used in industry fields requiring high performance of the motor. In the vector control method, a position sensor having a high resolution, such as an optical encoder and a resolver, is used because the vector control method requires continuously sensing a position of a rotor. However, the position sensor having a high resolution is expensive, and restricts an installation environment of an apparatus for controlling the motor.

A sensorless vector control method by which a position of the rotor is estimated without the sensor is proposed for solving the defect caused by using the position sensor.

In the sensorless vector control method, a phase excited for obtaining a maximum torque while the motor rotates is determined according to the position of the rotor. Also, the position of the rotor is measured by an inverse electromotive force while the rotor rotates. On the basis of the above, a proper phase for obtaining a maximum torque is selectively excited so that the rotation of the motor is controlled.

However, a problem arises in that it is difficult or impossible to estimate the rotation velocity of the motor in a zero-speed or a low-speed period of the motor because the rotation velocity of the motor is estimated by the inverse electromotive force or by estimating a magnetic flux of the rotor.

A sensorless control method and apparatus of a permanent magnet synchronous motor for continually controlling the velocity in a overall velocity period of the motor is disclosed in U.S. Pat. No. 6,081,093.

The sensorless control method and the apparatus disclosed in U.S. Pat. No. 6,081,093 modifies a command velocity and an estimation velocity with a weight using a membership function, and sums up the command velocity and the estimation velocity modified with the weight for smooth conversion from a low speed to a high speed. That is, a relative importance of the weight of the command velocity is larger in an initial start period or a low-speed period.

However, if the sensorless control method and apparatus disclosed in U.S. Pat. No. 6,081,093 is applied to a system in which a fluctuation of disturbance torque is great in an initial start period, such as that of a washing machine, the system may fail to initially start because of an instability operating caused by a large error in a real position of the rotor and a position command, and between the velocity and the velocity command.

SUMMARY OF THE INVENTION

The present invention provides an apparatus and a method for controlling a velocity of a motor, which is capable of calculating an accurate reference estimation velocity of the motor at an overall velocity period of the motor.

According to an aspect of the present invention, there is provided an apparatus controlling a velocity of a motor having a rotor, the apparatus comprising a sensing velocity calculator sensing a rotation velocity of the motor, and calculating a sensing velocity on the basis of the sensed rotation velocity of the motor; a velocity estimator estimating an estimation velocity of the motor based on an information about a position error of the rotor; and a reference velocity calculator dividing an overall velocity period of the motor into a plurality of unit velocity periods based on a command velocity for controlling the rotation velocity of the motor, calculating a sum of the sensing velocity, the estimation velocity, and the command velocity after investing at least one of the sensing velocity, the estimation velocity, and the command velocity with a predetermined weight, and outputting the sum as a reference estimation velocity of the motor.

According to an aspect of the present invention, the plurality of unit velocity periods comprise a low-speed period in which the weight for the command velocity is "1", and the weight for the sensing velocity and the estimation velocity are respectively "0"; a middle-speed period in which the weight for the sensing velocity is "1", and the weight for the command velocity and the estimation velocity are respectively "0"; a high-speed period in which the weight for the estimation velocity is "1", and the weight for the command velocity and the sensing velocity are respectively "0"; a first conversion period between the low-speed velocity and the middle-speed velocity; and a second conversion period between the middle-speed velocity and the high-speed velocity.

According to an aspect of the present invention, the reference velocity calculator calculates a sum of the command velocity and the sensing velocity, and outputs the sum of the command velocity and the sensing velocity as the reference estimation velocity in the first conversion period.

According to an aspect of the present invention, the reference velocity estimator decreases the weight for the command velocity in accordance with an increase of the command velocity, and increase the weight for the sensing velocity in accordance with the increase of the command velocity when the command velocity is in the first conversion period in which the command velocity increase.

According to an aspect of the present invention, wherein the reference velocity calculator calculates a sum of the sensing velocity and the estimation velocity, and outputs the sum of the sensing velocity and the estimation velocity as the reference estimation velocity in the second conversion period.

According to an aspect of the present invention, the reference velocity estimator decreases the weight for the sensing velocity in accordance with an increase of the command velocity, and increase the weight for the estimation velocity in accordance with the increase of the command velocity when the command velocity is in the second conversion period in which the command velocity increase.

According to an aspect of the present invention, the weight linearly increases or decreases in accordance with the increase of the command velocity in the first conversion period and the second conversion period.

According to an aspect of the present invention, the weight sigmoidally increases or decreases in accordance with the increase of the command velocity in the first conversion period and the second conversion period.

According to an aspect of the present invention, the weight linearly increases or decreases in accordance with the increase of the command velocity in the first conversion period and the second conversion period.

According to an aspect of the present invention, the weight sigmoidally increases or decreases in accordance with the increase of the command velocity in the first conversion period and the second conversion period.

According to another aspect of the present invention, there is provided a method for controlling a velocity of a motor having a rotor, comprising calculating a sensing velocity based on sensing a rotation velocity of the motor; estimating an estimation velocity of the motor on the basis of information about a position error of the rotor; generating a command velocity for controlling the rotation velocity of the motor; dividing an overall velocity period of the motor into a plurality of unit velocity periods on the basis of the command velocity; and calculating a reference estimation velocity by summing up the sensing velocity, the estimation velocity, and the command velocity after investing at least one of the sensing velocity, the estimation velocity, and the command velocity with a predetermined weight in the unit velocity period.

According to another aspect of the present invention, the plurality of unit velocity periods comprise a low-speed period in which the weight for the command velocity is "1", and the weight for the sensing velocity and the estimation velocity are respectively "0"; a middle-speed period in which the weight for the sensing velocity is "1", and the weight for the command velocity and the estimation velocity are respectively "0"; a high-speed period in which the weight for the estimation velocity is "1", and the weight for the command velocity and the sensing velocity are respectively "0"; a first conversion period between the low-speed velocity and the middle-speed velocity; and a second conversion period between the middle-speed velocity and the high-speed velocity.

According to another aspect of the present invention, the calculating the reference estimation velocity comprises multiplying the command velocity and the sensing velocity by each correspondent weight respectively in the first conversion period; and calculating the reference estimation velocity by summing up the command velocity multiplied by the correspondent weight and the sensing velocity multiplied by the correspondent weight.

According to another aspect of the present invention, when the first conversion period is a period in which the command velocity increases, the multiplying the command velocity and the sensing velocity by each correspondent weight respectively in the first conversion period comprises multiplying the command velocity by the correspondent weight together with a decrease of the correspondent weight in accordance with the increase of the command velocity; and multiplying the sensing velocity by the correspondent weight together with an increase of the correspondent weight in accordance with the increase of the command velocity.

According to another aspect of the present invention, the calculating the reference estimation velocity comprises multiplying the sensing velocity and the estimation velocity by each correspondent weight respectively in the second conversion period; and calculating the reference estimation velocity by summing up the sensing velocity multiplied by the correspondent weight and the estimation velocity multiplied by the correspondent weight.

According to another aspect of the present invention, when the second conversion period is a period in which the command velocity increases, the multiplying the sensing velocity and the estimation velocity by each correspondent weight respectively in the second conversion period comprises multiplying the sensing velocity by the correspondent weight together with a decrease of the correspondent weight in accordance with the increase of the command velocity; and multiplying the estimation velocity by the correspondent weight together with an increase of the correspondent weight in accordance with the increase of the command velocity.

According to another aspect of the present invention, the weight linearly increases or decreases in accordance with the increase of the command velocity in the first conversion period and the second conversion period.

According to another aspect of the present invention, the weight sigmoidally increases or decreases in accordance with the increase of the command velocity in the first conversion period and the second conversion period.

According to another aspect of the present invention, the weight linearly increases or decreases in accordance with the increase of the command velocity in the first conversion period and the second conversion period.

According to another aspect of the present invention, the weight sigmoidally increases or decreases in accordance with the increase of the command velocity in the first conversion period and the second conversion period.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
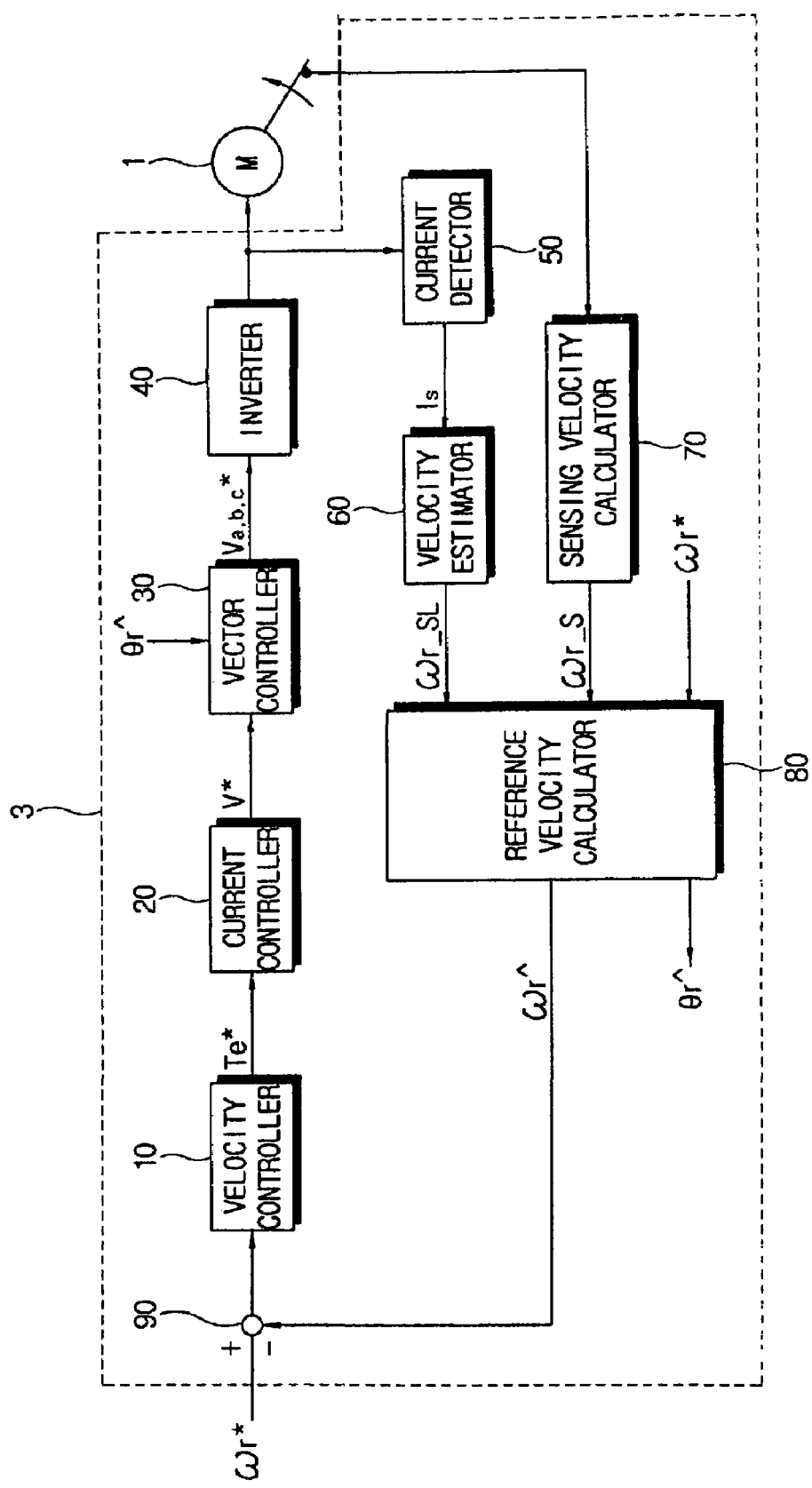
FIG. 1 is a control block diagram of an apparatus for controlling a velocity of a motor according to an exemplary embodiment of the present invention.

Reference will now be made in detail to the exemplary embodiments of the present invention, examples of which are illustrated in the accompanying drawings, wherein like reference numerals refer to like elements throughout.

As shown in FIG. 1, an apparatus 3 for controlling a velocity of a motor 1 according to an exemplary embodiment of the present invention comprises an inverter 40, a current detector 50, a velocity estimator 60, a sensing velocity calculator 70, a reference velocity calculator 80, a velocity controller 10, a current controller 20, and a vector controller 30.

The motor 1 controlled by the apparatus 3 according to the exemplary embodiment of the present invention may comprise at least one of a surface-mounted permanent magnet synchronous motor (SPMSM) and an interior permanent magnet synchronous motor (IPMSM). The motor 1 operates according to power supplied from the inverter 40.

The inverter 40 supplies the power to the motor 1 for operating. The inverter 40 controls a rotation velocity of the motor 1 by controlling a current supplied to the motor 1, such as a three-phase current, on the basis of a voltage command signal from the vector controller 30.

The current detector 50 detects a current of each of a plurality of output terminals of the inverter 40, generates a detection current vector Is on the basis of the detected currents of the output terminals of the inverter 40, and output the detection current vector Is to the velocity estimator 60.

The current detector 50 may be provided with various configurations. For example, the current detector 50 may directly detect the three-phase current of the motor 1 using a current transducer or a series shunt resistor. Also, the current detector 50 may comprise two current transducers and two series shunt resistors, detect two phase current of the motor 1 by using the two current transducers and the two series shunt resistors, and estimate a current of the rest of the three-phase currents on the basis of the detected two phase current.

The velocity estimator 60 receives the detection current vector Is output from the current detector 50, and estimates and outputs an estimation velocity ωr_SL on the basis of the detection current vector Is. The estimation velocity ωr_SL output from the velocity estimator 60 is input to the reference velocity calculator 80.

The velocity estimator 60 estimates the estimation velocity ωr_SL of the motor 1 on the basis of a position error of a rotor of the motor 1. The position error of the rotor may be calculated by estimating of a counter electromotive force of the motor 1. For example, the counter electromotive force of the motor 1 may be calculated by a method for estimating of the counter electromotive force disclosed in "Sensorless control of interior permanent-magnet machine drives with zero-phase lag position estimation" by Hyun-bae Kim et al. (IEEE Transactions on Industry Applications, Volume: 39, Issue: 6, November-December 2003), the disclosure of which is incorporated herein by reference.

Further, the velocity estimator 60 may calculate the position error of the rotor using a high frequency. For example, the position error may be calculated by a method for calculating the position error of the rotor using the high frequency disclosed in "Position estimation in induction machine utilizing rotor bar slot harmonics and carrier-frequency signal injection" by M. W. Wegner et al. (IEEE Transactions on Industry Applications, Volume 36, Issue 3, May-June 2000), the disclosure of which is incorporated herein by reference.

The sensing velocity calculator 70 senses a rotation position of the rotor and calculates a sensing velocity ωr_S on the basis of the sensed rotation position of the rotor. The sensing velocity ωr_S calculated by the sensing velocity calculator 70 is input to the reference velocity calculator 80. Here, it is preferable but not necessary to use a sensor having a low resolution, such as a Hall sensor for sensing the rotation position of the rotor used in the sensing velocity calculator 70 in order to reduce manufacturing expenses.

The reference velocity calculator 80 divides an overall velocity period of the motor 1 into a plurality of unit velocity periods on the basis of a command velocity ωr* for controlling the rotation velocity of the motor 1. Further, the reference velocity calculator 80 multiplies at least one of the command velocity ωr*, the sensing velocity ωr_S and the estimation velocity ωr_SL by a predetermined weight K1, K2 and K3, respectively. Then, the reference velocity calculator 80 calculates a sum of the sensing velocity ωr_S, the estimation velocity ωr_SL, and the command velocity ωr* as a reference estimation velocity ωr^ of the motor 1. Also, the reference velocity calculator 80 may calculate a reference estimation position θr^ of the motor 1 on the basis of the reference estimation velocity ωr^. A method for calculating the reference estimation velocity ωr^ and/or the reference estimation position θr^ calculated by the reference velocity calculator 80 is described later.

A comparator 90 compares the reference estimation velocity ωr^ output from the reference velocity calculator 80 with the command velocity ωr*, and outputs a comparison value between the reference estimation velocity ωr^ and the command velocity ωr*. Then, the velocity controller 10 generates a torque command Te* on the basis of the comparison value output from the comparator 90 and outputs the torque command Te* to the current controller 20.

The current controller 20 receives the torque command Te* output from the velocity controller 10 and outputs a voltage vector command V*. The current controller 20 receives an estimation current value (not shown) calculated while the velocity estimator 60 estimates the estimation velocity ωr_SL, and reflects the estimation current value in generating the voltage vector command V*.

The vector controller 30 receives the voltage vector command V* output from the current controller 20 and the reference estimation position θr^ output from the reference velocity calculator 80 and outputs voltage command signals Va,b,c* corresponding to each phase of the inverter 40 on the basis of the voltage vector command V* and the reference estimation position θr^.

Hereinbelow, referring to FIG. 2, the reference velocity calculator 80 according to an exemplary embodiment the present invention is described in detail.

Figure 2:
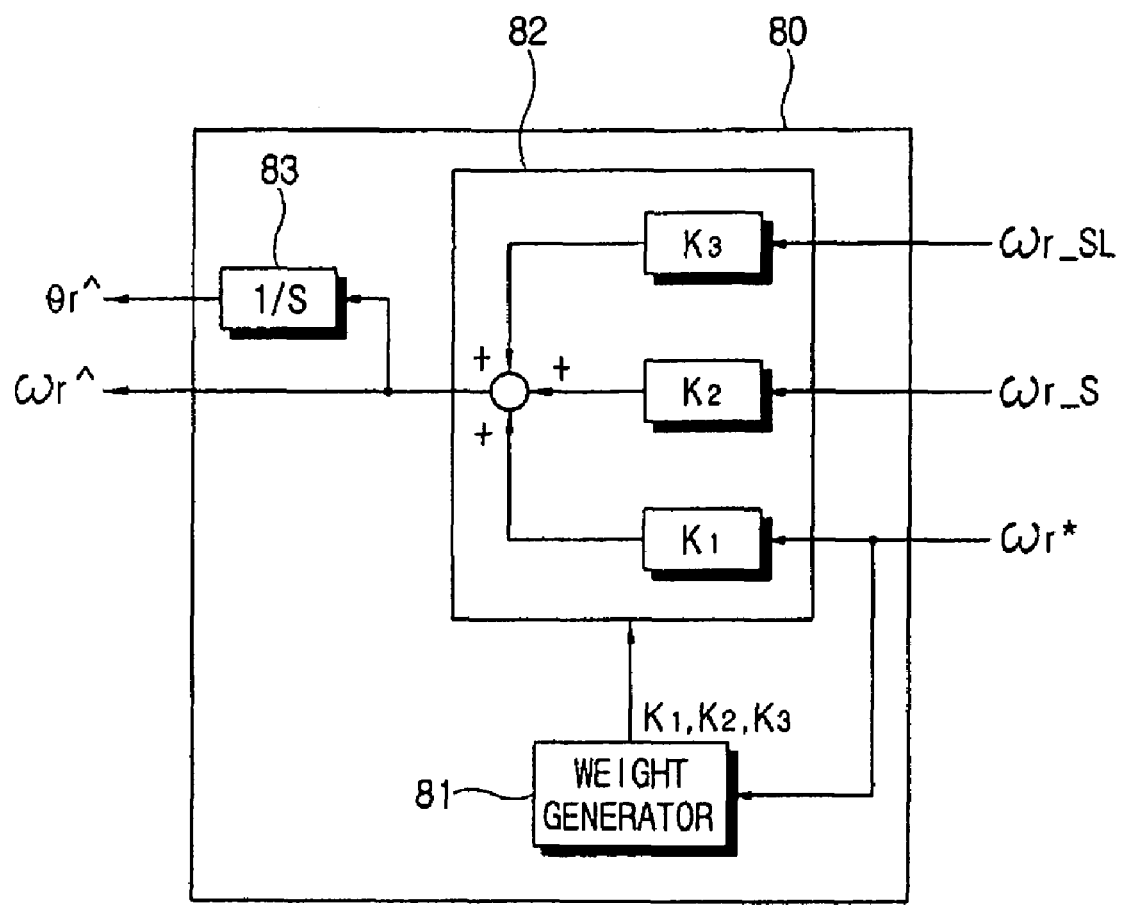
FIG. 2 illustrates a reference velocity calculator of FIG. 1 according to an exemplary embodiment of the present invention.

As shown in FIG. 2, the reference velocity calculator 80 according to the present invention comprises a weight generator 81 outputting the weights K1, K2 and K3 multiplied to the command velocity ωr*, the sensing velocity ωr_S and the estimation velocity ωr_SL and a reference velocity generator 82 calculating the reference estimation velocity ωr^ after multiplying the command velocity ωr*, the sensing velocity ωr_S, and the estimation velocity ωr_SL by the weights K1, K2 and K3, respectively. The reference velocity calculator 80 further comprises a integrator 80 outputting the reference estimation position θr^.

The reference velocity calculator 80 divides the overall velocity period of the motor 1 with the plurality of the unit velocity period. The unit velocity period may comprise a low-speed period LP, a middle-speed period MP, a high-speed period HP, a first conversion period TP1 between the low-speed period LP and the middle-speed period MP, and a second conversion period TP2 between the middle-speed period MP and the high-speed period HP.

Figure 3:
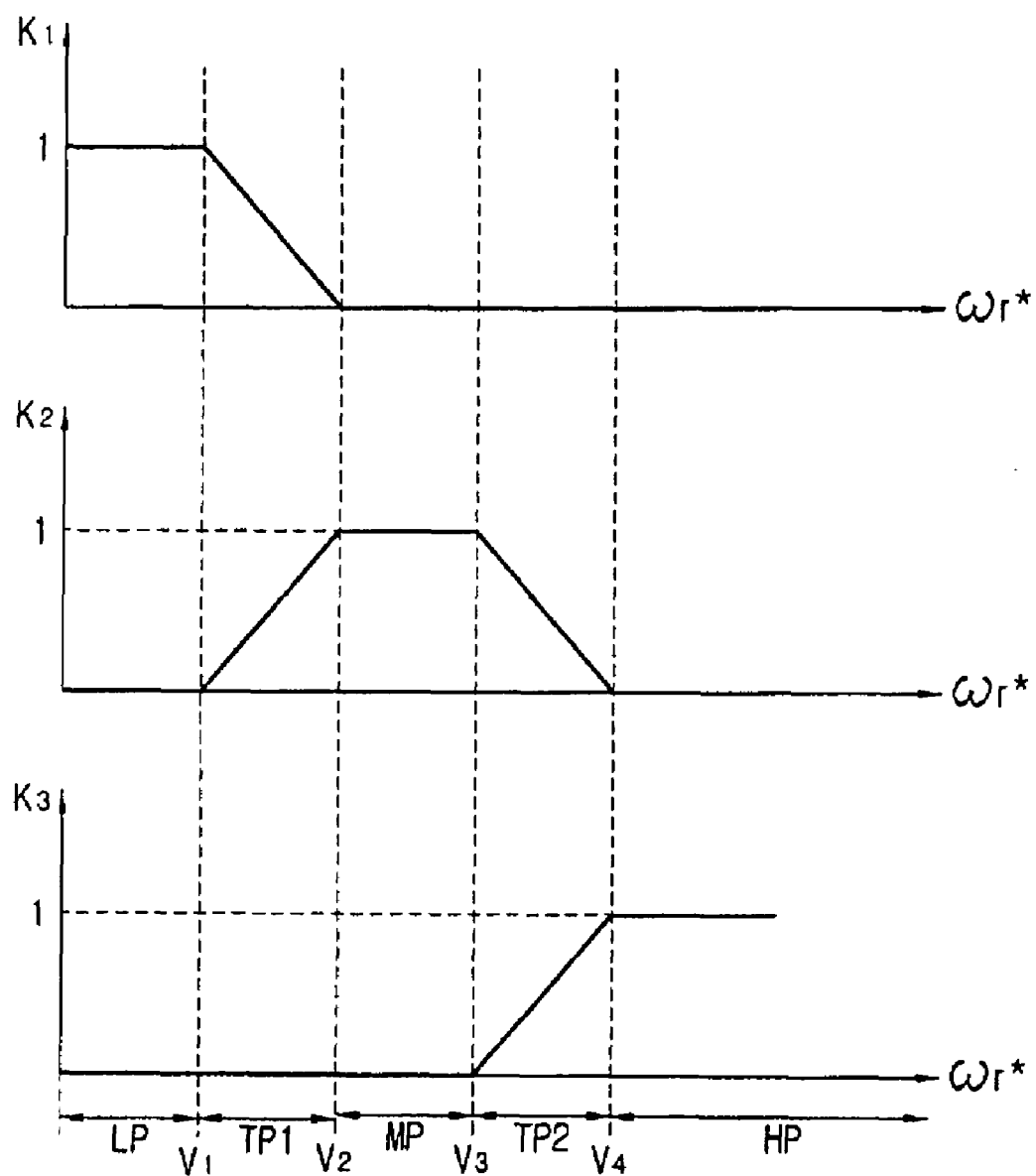
FIGS. 3 and 4 illustrate a change of each weight output from the reference velocity calculator of FIG. 1 in accordance with a change of a command velocity.
Figure 4:
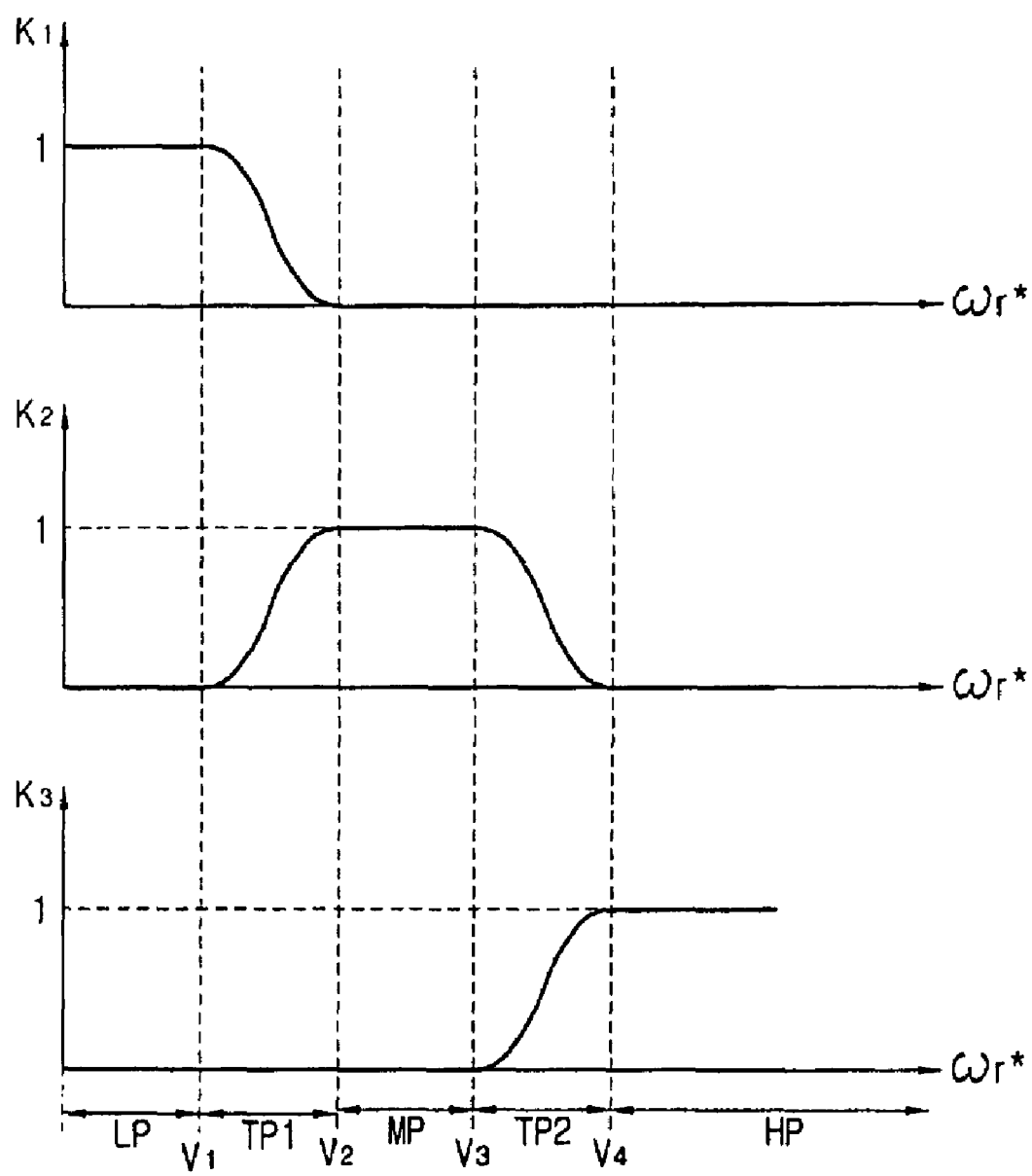

The weight generator 81 receives the command velocity ωr* and determines the present unit velocity period on the basis of the command velocity ωr*. For example, as shown in FIGS. 3 and 4, when the command velocity ωr* ranges between a zero velocity and a first velocity V1, the weight generator 81 determines the present unit velocity period as the low-speed period LP. In the same manner, the weight generator 81 may determine the present unit period of velocity as the first conversion period TP1 when the command velocity ωr* ranges between the first velocity V1 and a second velocity V2, as the middle-speed period MP when the command velocity ωr* ranges between the second velocity V2 and a third velocity V3, as the second conversion period TP2 when the command velocity ωr* ranges between the third velocity V3 and a fourth velocity V4, and as the high-speed period HP when the command velocity ωr* is greater than the fourth velocity V4.

When the command velocity ωr* is in the range of the low-speed period LP, the weight generator 81 sets a weight corresponding to the command velocity ωr* (hereinafter, referred to as "a command weight K1") as "1", sets a weight corresponding to the sensing velocity ωr_S (hereinafter, referred to as "a sensing weight K2") as "0" and sets a weight corresponding to the estimation velocity ωr_SL (hereinafter, referred to as "a estimation weight K3") as "0". Thus, the command velocity ωr* is output from the reference velocity calculator 80 as the reference estimation velocity ωr^ in the low-speed period LP. Thus, when the motor 1 initially starts, the reference the command velocity ωr* is output as the estimation velocity ωr^ in the state that the calculation of the rotation velocity by the Hall sensor and the sensorless control are difficult.

When the command velocity ωr* is in the range of the middle-speed period MP, the weight generator 81 sets the sensing weight K2 sets as "1", sets the command weight K1 as "0" and sets the estimation weight K3 as "0". Thus, the sensing velocity ωr_S is output from the reference velocity calculator 80 as the reference estimation velocity ωr^ in the middle-speed period MP. Thus, it is possible to control the motor 1 on the basis of information from the sensing velocity calculator 70 at the middle-speed period MP in which it is difficult to control the motor 1 by sensorless control, but is possible to sense the rotation velocity of the motor 1 by the sensor having the low resolution.

When the command velocity ωr* is in the range of the high-speed period HP, the weight generator 81 sets the estimation weight K3 as "1", sets the command weight K1 as "0" and sets the sensing weight K2 as "0". Thus, the estimation velocity ωr_SL is output from the reference velocity calculator 80 as the reference estimation velocity ωr^ at the high-speed period HP. Thus, it is possible to control the motor 1 by the sensorless control, when the motor 1 operates at high speed over a predetermined speed.

When the command velocity ωr* is in the range of the first conversion period TP1, the weight generator 81 multiplies the command velocity ωr* and the sensing velocity ωr_S by the command weight K1 and the sensing weight K2 varied according to the command velocity ωr*, respectively. Further, the weight generator 81 outputs a sum of the weighted command velocity ωr* and the weighted sensing velocity ωr_S as the reference estimation velocity ωr^.

When the command velocity ωr* enters the first conversion period TP1, the weight generator 81 decreases the command weight K1 output as "1" at the low-speed period LP and increases the sensing weight K2 output as "0" at the low-speed period LP in accordance with an increase of the command velocity ωr*. Further, the reference velocity generator 82 multiplies the command weight K1 decreased in accordance with the increase of the command velocity ωr* by the command velocity ωr*, multiplies the sensing weight K2 increased in accordance with the increase of the command velocity ωr* by the sensing velocity ωr_S, and outputs a sum of the command velocity ωr* and the sensing velocity ωr_S as the reference estimation velocity ωr^. Thus, when the command velocity ωr* is changed from the low-speed period LP to the middle-speed period MP, a sudden change of the reference estimation velocity due to the variation between the command velocity ωr* and the sensing velocity ωr_S is minimized.

When the command velocity ωr* enters the second conversion period TP2, the weight generator 81 decreases the sensing weight K2 output as "1" in the middle-speed period MP and increases the estimation weight K3 output as "0" in the middle-speed period MP in accordance with an increase of the command velocity ωr*. Further, the reference velocity generator 82 multiplies the sensing velocity ωr_S by the sensing weight K2 decreased in accordance with the increase command velocity ωr*, multiplies the estimation velocity ωr_SL by the estimation weight K3 increased in accordance with the increase of the command velocity ωr*, and outputs a sum of the sensing velocity ωr_S and the estimation velocity ωr_SL as the reference estimation velocity ωr^. Thus, when the command velocity ωr* is changed from the middle-speed period MP to the high-speed period HP, a sudden change of the reference estimation velocity owing to the variation between the sensing velocity ωr_S and the estimation velocity ωr_SL is minimized In FIG. 3, the weight generator 81 increases and/or decreases each weight K1, K2 and K3 linearly in the first conversion period TP1 and the second conversion period TP2 in accordance with the increase of the command velocity ωr* as an example. Further, in FIG. 4, the weight generator 81 increases and/or decreases each weight K1, K2 and K3 sigmoidally in the first conversion period TP1 and the second conversion period TP2 in accordance with the increase of the command velocity ωr* as another example.

Figure 5:
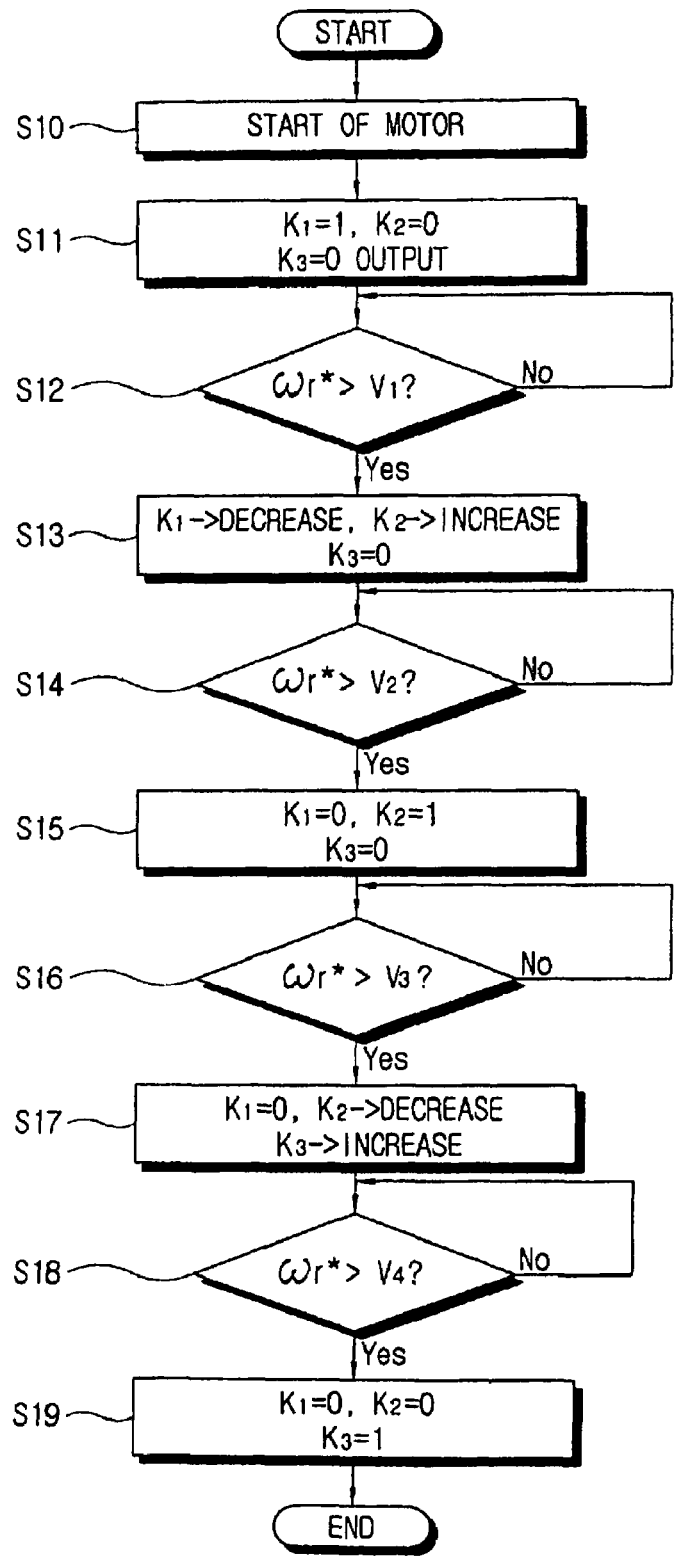
FIG. 5 is a control flowchart illustrating a method for controlling velocity according to an exemplary embodiment of the present invention.

Hereinafter, referring to FIG. 5, a velocity control method according to an exemplary embodiment of the present invention is described in detail.

First, when the motor 1 initially starts at operation S10, the weight generator 81 outputs the command weight K1 as "1", the sensing weight K2 as "0", and the estimation weight K3 as "0" at operation S11. At this time, each weight K1, K2 and K3 output from the weight generator 81 is input to the reference velocity generator 82. The reference velocity generator 82 multiplies the command velocity ωr*, the sensing velocity ωr_S, and the estimation velocity ωr_SL by weights K1, K2 and K3, respectively. Also, the reference velocity generator 82 outputs the sum of the command velocity ωr* multiplied by the command weight K1, the sensing velocity ωr_S multiplied by the sensing weight K2, and the estimation velocity ωr_SL multiplied by the estimation weight K3 as the reference estimation velocity ωr^.

Next, the weight generator 81 determines whether the command velocity ωr* exceeds the first velocity V1 at operation S12. When the command velocity ωr* exceeds the first velocity V1, that is, the command velocity ωr* enters the first conversion period TP1, the weight generator 81 decreases the command weight K1 from "1", increases the sensing weight K2 from "0" in accordance with the increase of the command velocity ωr*, and sets estimation weight K3 output as "0" at operation S13.

The weight generator 81 then determines whether the command velocity ωr* exceeds the second velocity V2 at operation S14. Then, the weight generator 81 sets the sensing weight K2 as "1", sets the command weight K1 as "0" and sets the estimation weight K3 as "0", when the command velocity ωr* exceeds the second velocity V2, that is, the command velocity ωr* enters the middle-speed period MP, at operation S15.

Next, the weight generator 81 determines whether the command velocity ωr* exceeds the third velocity V3 at operation S16. When the command velocity ωr* exceeds the third velocity V3, that is, the command velocity ωr* enters the second conversion period TP2, the weight generator 81 decreases the sensing weight K2 from "1", increases the estimation weight K3 from "0" in accordance with the increase of the command velocity ωr*, and sets the command weight K1 as "0", when the command velocity ωr* exceeds the third velocity V3, that is, enters the second conversion period TP2 at operation S17.

Next, the weight generator 81 then determines whether the command velocity ωr* exceeds the fourth velocity V4 at operation S18. The weight generator 81 then sets the estimation weight K3 as "1", sets the command weight K1 as "0" and sets the sensing weight K2 as "0", when the command velocity ωr* exceeds the fourth velocity V4, that is, the command velocity ωr* enters the high-speed period HP at operation S19. Thus, it is possible that the reference estimation velocity ωr^ which is robust against a fluctuation of a disturbance torque at the initial start of the motor 1, and is accurate in the total velocity period of the motor 1, is calculated, before the rotation velocity of the motor 1 exceeds the fourth velocity V4 in which the sensorless control is feasible.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An apparatus controlling a velocity of a motor having a rotor, the apparatus comprising:
    a sensing velocity calculator which senses a rotation position of the motor, and calculates a sensing velocity on the basis of the sensed rotation position of the motor;
    a velocity estimator which estimates an estimation velocity of the motor based on information about a position error of the rotor; and
    a reference velocity calculator which divides an overall velocity period of the motor into a plurality of unit velocity periods based on a command velocity for controlling a rotation velocity of the motor, calculates a sum of the sensing velocity, the estimation velocity, and the command velocity after multiplying at least one of the sensing velocity, the estimation velocity, and the command velocity by a predetermined weight, and outputs the sum as a reference estimation velocity of the motor.

2. The apparatus according to claim 1, wherein the plurality of unit velocity periods comprise:
    a low-speed period in which a weight for the command velocity is "1", and a weight for the sensing velocity and a weight for the estimation velocity are "0";
    a middle-speed period in which the weight for the sensing velocity is "1", and the weight for the command velocity and the weight for the estimation velocity are "0";
    a high-speed period in which the weight for the estimation velocity is "1", and the weight for the command velocity and the weight for the sensing velocity are "0";
    a first conversion period between the low-speed velocity and the middle-speed velocity; and
    a second conversion period between the middle-speed velocity and the high-speed velocity.

3. The apparatus according to claim 2, wherein the reference velocity calculator calculates a sum of the command velocity and the sensing velocity, and outputs the sum of the command velocity and the sensing velocity as the reference estimation velocity in the first conversion period.

4. The apparatus according to claim 3, wherein when the command velocity is in the first conversion period, the reference velocity estimator decreases the weight for the command velocity in accordance with an increase of the command velocity, and increases the weight for the sensing velocity in accordance with the increase of the command velocity.

5. The apparatus according to claim 2, wherein the reference velocity calculator calculates a sum of the sensing velocity and the estimation velocity, and outputs the sum of the sensing velocity and the estimation velocity as the reference estimation velocity in the second conversion period.

6. The apparatus according to claim 5, wherein when the command velocity is in the second conversion period, the reference velocity estimator decreases the weight for the sensing velocity in accordance with an increase of the command velocity, and increases the weight for the estimation velocity in accordance with the increase of the command velocity.

7. The apparatus according to claim 4, wherein the reference velocity estimator linearly decreases the weight for the command velocity and linearly increases the weight for the sensing velocity in accordance with the increase of the command velocity in the first conversion period.

8. The apparatus according to claim 4, wherein the reference velocity estimator sigmoidally decreases the weight for the command velocity and sigmoidally increases the weight for the sensing velocity in accordance with the increase of the command velocity in the first conversion period.

9. The apparatus according to claim 6, wherein the reference velocity estimator linearly decreases the weight for the sensing velocity and linearly increases the weight for the estimation velocity in accordance with the increase of the command velocity in the second conversion period.

10. The apparatus according to claim 6, wherein the reference velocity estimator sigmoidally decreases the weight for the sensing velocity and sigmoidally increases the weight for the estimation velocity in accordance with the increase of the command velocity in the second conversion period.

11. A method for controlling a velocity of a motor having a rotor, the method comprising:
    calculating a sensing velocity based on sensing a rotation position of the motor;
    estimating an estimation velocity of the motor on the basis of information about a position error of the rotor;
    generating a command velocity for controlling a rotation velocity of the motor;
    dividing an overall velocity period of the motor into a plurality of unit velocity periods on the basis of the command velocity; and
    calculating a reference estimation velocity by summing the sensing velocity, the estimation velocity, and the command velocity after multiplying at least one of the sensing velocity, the estimation velocity, and the command velocity by a predetermined weight in a unit velocity period.

12. The method according to claim 11, wherein the plurality of unit velocity periods comprise:
    a low-speed period in which a weight for the command velocity is "1", and a weight for the sensing velocity and a weight for the estimation velocity are "0";
    a middle-speed period in which the weight for the sensing velocity is "1", and the weight for the command velocity and the weight for the estimation velocity are "0";
    a high-speed period in which the weight for the estimation velocity is "1", and the weight for the command velocity and the weight for the sensing velocity are "0";
    a first conversion period between the low-speed velocity and the middle-speed velocity; and
    a second conversion period between the middle-speed velocity and the high-speed velocity.

13. The method according to claim 12, wherein the calculating the reference estimation velocity comprises:
    multiplying the command velocity by the weight for the command velocity and multiplying the sensing velocity by the weight for the sensing velocity in the first conversion period; and
    calculating the reference estimation velocity by summing the command velocity multiplied by the weight for the command velocity and the sensing velocity multiplied by the weight for the sensing velocity.

14. The method according to claim 13, wherein the first conversion period is a period in which the command velocity increases, and in the first conversion period, the weight for the command velocity decreases in accordance with the increase of the command velocity, and the weight for the sensing velocity increases in accordance with the increase of the command velocity.

15. The method according to claim 12, wherein the calculating the reference estimation velocity comprises:
multiplying the sensing velocity by the weight for the sensing velocity and multiplying the estimation velocity by the weight for the estimation velocity in the second conversion period; and
calculating the reference estimation velocity by summing the sensing velocity multiplied by the weight for the sensing velocity and the estimation velocity multiplied by the weight for the estimation velocity.

16. The method according to claim 15, wherein the second conversion period is a period in which the command velocity increases, and in the second conversion period, the weight for the sensing velocity decreases in accordance with the increase of the command velocity, and the weight for the estimation velocity increases in accordance with the increase of the command velocity.

17. The method according to claim 13, wherein the weight for the command velocity linearly decreases and the weight for the sensing velocity linearly increases in accordance with the increase of the command velocity in the first conversion period.

18. The method according to claim 13, wherein the weight for the command velocity sigmoidally decreases and the weight for the sensing velocity sigmoidally increases in accordance with the increase of the command velocity in the first conversion period.

19. The method according to claim 15, wherein the weight for the sensing velocity linearly decreases and the weight for the estimation velocity linearly increases in accordance with the increase of the command velocity in the second conversion period.

20. The method according to claim 15, wherein the weight for the sensing velocity linearly sigmoidally decreases and the weight for the estimation velocity linearly increases in accordance with the increase of the command velocity in the second conversion period.

* * * * *